July 29, 1924.
G. L. CANON
1,503,299
CALCULATOR
Filed Dec. 14, 1922
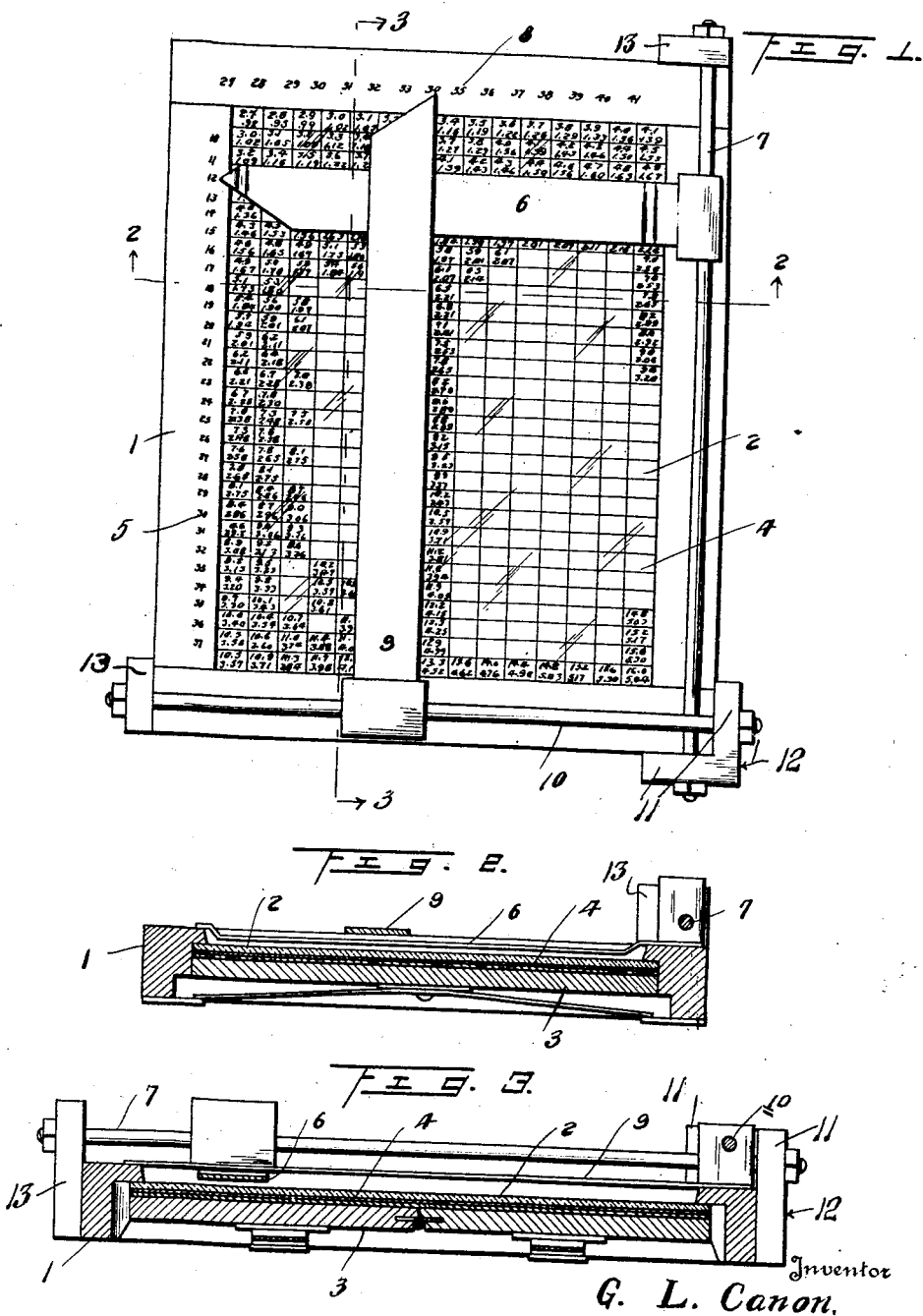
Inventor
G. L. Canon.
By
Attorney Patented July 29, 1924.

1,503,299

UNITED STATES PATENT OFFICE.

GLEN L. CANON, OF CARSON, IOWA.

CALCULATOR.

Application filed December 14, 1922. Serial No. 606,902.

*To all whom it may concern:*

Be it known that I, GLEN L. CANON, a citizen of the United States, residing at Carson, in the county of Pottawattamie and State of Iowa, have invented certain new and useful Improvements in Calculators; and I do hereby declare the following to be a full, clear, and exact description of the invention, such as will enable others skilled in the art to which it appertains to make and use the same.

The primary object of the present invention is the saving of time and labor and at the same time to insure accurate results in the calculating of the amount of butter fat and the price of cream, the weight, test and price being given.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a plan view of a calculator embodying the invention,

Figure 2 is a section on the line 2—2 of Figure 1, and

Figure 3 is a section on the line 3—3 of Figure 1.

Corresponding and like parts are referred to in the following description and designated in the several views of the drawings by like reference characters.

In accordance with the invention, the device comprises a frame 1 to which is fitted a glass plate 2 and a removable back 3, the frame and adjunctive parts corresponding with the usual frame commonly provided for photographic printing. A sheet 4 is mounted in the frame between the glass plate 2 and the back 3 and contains the calculations which appear in ruled spaces disposed in longitudinal and lateral straight lines, each space containing an upper and a lower number, the upper number corresponding with the amount of butter fat and the lower number indicating the price, said numbers preferably appearing in contrasting color, the upper number being preferably red and the lower number black, whereby to readily distinguish the coordinate numbers. The price calculations appearing on the sheet illustrated are based on a cost price of 34 cents. In practice, there will be a separate sheet for each price and, when making a calculation, the proper sheet must be selected and placed in position in the frame. The removable back 3 provides for the ready changing of the sheet.

A weight scale 5 appears along one side of the frame and a weight hand 6 cooperates therewith and is of a length to extend across to the opposite side of the frame where it is slidably mounted upon a guide rod 7. A test scale 8 is provided at a side of the frame 1 adjacent the weight scale 5, and a test hand 9 is arranged to cooperate therewith and extends across the frame to the opposite side where it is mounted upon a slide rod 10 so as to slide across the frame over the glass plate 2 beneath which is disposed the calculating sheet 4. The two hands 6 and 9 are disposed relatively at a right angle and cross and the numbers appearing in the space at the point of crossing of the hands correspond with the amount of butter fat and the price of the cream contained in a given amount of milk, the weight and test of which are known, having been previously determined. The top edge of the weight hand 6 and the inner or right hand edge of the test hand 9 correspond with the calculating edges and the space appearing in the angle formed by such edges contains the numbers corresponding with the calculation. The guide rods 7 and 10 may be mounted in any manner to admit of the respective hands sliding thereon, as in the wings 11 of a corner bracket 12 and in the corner brackets 13.

What is claimed is:

1. A calculator having a frame provided with indications, said frame having members forwardly offset with respect to said indications and themselves bearing indications, a hand slidable along the frame coacting with the first mentioned indications and overlapping one of said members to coact with the indications thereof, said hand being depressed intermediate its ends, and a hand cooperating with the first indications slidable in a path at a right angle to and over said depressed portion and at one end overlapping the other member to coact with the indications thereof.

2. A calculator having a frame provided with indications, said frame having members forwardly offset with respect to said indications and themselves bearing indications, a hand slidable along the frame coacting with the first mentioned indications and overlapping one of said members to coact with the indications thereof, said hand being depressed intermediate its ends, a hand cooperating with the first indications slidable in a path at a right angle to and over said depressed portion and at one end overlapping the other member to coact with the indications thereof, angularly disposed rods for mounting said hands, and a corner bracket on the frame having angularly disposed wings to which said rods are respectively attached.

In testimony whereof I affix my signature in presence of two witnesses.

GLEN L. CANON.

Witnesses:
DETTY A. DAMMROW,
LEE R. YODON.